US009508255B2

(12) United States Patent
Mi

(10) Patent No.: US 9,508,255 B2
(45) Date of Patent: Nov. 29, 2016

(54) INTEGRATED SYSTEM OF INFRARED REMOTE CONTROLS

(71) Applicant: Tsung-Hsiang Mi, Zhongli (TW)

(72) Inventor: Tsung-Hsiang Mi, Zhongli (TW)

( * ) Notice: Subject to any disclaimer, the term of this patent is extended or adjusted under 35 U.S.C. 154(b) by 30 days.

(21) Appl. No.: 14/295,399

(22) Filed: Jun. 4, 2014

(65) Prior Publication Data

US 2015/0356866 A1 Dec. 10, 2015

(51) Int. Cl.
*H04B 10/00* (2013.01)
*G08C 23/04* (2006.01)
*G06F 3/041* (2006.01)
*G08C 17/02* (2006.01)

(52) U.S. Cl.
CPC .............. *G08C 23/04* (2013.01); *G06F 3/041* (2013.01); *G08C 17/02* (2013.01); *G08C 2201/30* (2013.01); *G08C 2201/40* (2013.01)

(58) Field of Classification Search
None
See application file for complete search history.

(56) References Cited

U.S. PATENT DOCUMENTS

| 6,473,608 | B1 * | 10/2002 | Lehr | G05F 1/66 370/402 |
|---|---|---|---|---|
| 2002/0088486 | A1 * | 7/2002 | Chen | H02J 7/355 136/243 |
| 2004/0110469 | A1 * | 6/2004 | Judd | G01S 19/25 455/15 |
| 2009/0277668 | A1 * | 11/2009 | Kinyon | B23K 1/0016 174/254 |
| 2011/0260903 | A1 * | 10/2011 | Wong | G08C 23/04 341/176 |
| 2012/0001738 | A1 * | 1/2012 | Hilgers | G08C 17/02 340/12.5 |
| 2013/0075031 | A1 * | 3/2013 | Lai | C09J 163/00 156/273.9 |
| 2013/0171981 | A1 * | 7/2013 | Woo | G08C 17/02 455/420 |

* cited by examiner

*Primary Examiner* — Ken N Vanderpuye
*Assistant Examiner* — David Lambert
(74) *Attorney, Agent, or Firm* — Alan D. Kamrath; Kamrath IP Lawfirm, P.A.

(57) ABSTRACT

An integrated system of infrared remote controls includes a touch remote control and at least one infrared emitter. The touch remote control is wirelessly connected with the infrared emitter to transmit a remote signal. Each infrared emitter is mounted on a home appliance. When the infrared emitter receives the remote signal, the infrared emitter produces an infrared signal according to the remote signal and emits the infrared signal to the home appliance to control the home appliance. The infrared emitter can be adhered to or attracted on the home appliance by an adhesive layer or a magnet. Therefore, the infrared emitter can be easily mounted on the home appliance. It is very convenient for a user to set up and use the integrated system.

10 Claims, 6 Drawing Sheets

INTEGRATED SYSTEM OF INFRARED REMOTE CONTROLS

BACKGROUND OF THE INVENTION

1. Field of the Invention

The present invention relates to an integrated system and, especially, relates to an integrated system of infrared remote controls.

2. Description of the Related Art

With reference to FIG. 6, current home appliances are usually controlled by infrared remote controls. Each home appliance has a corresponding infrared remote control, for example, a television 41, a karaoke machine 42, a DVD player 43 and a set-top box 44 each having their respective infrared remote controls 411, 421, 431 and 441. Each infrared remote control can only control a home appliance corresponding to the infrared remote control. Therefore, when the user wants to use one of the home appliances, firstly, the user needs to find the infrared remote control of the home appliance, and controls the home appliance by the infrared remote control. As the home appliances increase, the infrared remote controls increase accordingly. It is not easy to quickly find a required infrared remote control to control the home appliance.

When using the infrared remote control, an infrared emitter of the infrared remote control should align with an infrared receiver of the home appliance. If an object is placed between the infrared emitter and the infrared receiver, the infrared remote control cannot control the home appliance. The infrared receiver of the home appliance has a receiving angle and a receiving area. When the infrared emitter of the infrared remote control is out of the receiving angle or the receiving area, the infrared remote control cannot control the home appliance.

The home appliances may be placed in a cabinet with a door of the cabinet closed to maintain appearance of the housing interior design. When the door of the cabinet is closed, the infrared remote control cannot control the home appliance. If the user wants to use the home appliance in the cabinet, the user needs to open the door of the cabinet.

With reference to FIG. 7, a remote control integrated system comprises a host 50, a host remote control 51, and a plurality of infrared transmitters 501. Each infrared transmitter 501 is electronically connected with the host 50 through a wire, and the infrared transmitters 501 respectively adhere to the infrared receivers 412, 422, 432, 442 of the home appliance. An infrared emitting surface of each infrared transmitter 501 is pointed to the infrared receiver of the home appliance. The host remote control 51 is connected with the host 50 through a wireless connection, such as Wi-Fi, Bluetooth, or ZigBee. The wireless connection has stronger power than the infrared. Therefore, even though the door of the cabinet is closed, the remote control can connect to the host 50 in the cabinet through the wireless connection. The host 50 is electronically connected to and transmits control signals to the infrared transmitters 501, and the infrared transmitters 501 can emit infrared signals to the infrared receivers of the home appliances to remotely control the home appliances according to the control signals. Therefore, the infrared remote controls of the home appliances can be integrated into the host remote control 51.

The host remote control 51 has a plurality of buttons, but not sufficient for all functions corresponding to all buttons of the infrared remote control of the home appliances. Therefore, when the user uses the host remote control 51 to control the home appliances, the user needs to select a control channel by pressing a channel button on the host remote control 51 to remotely control one of the home appliances corresponding to the selected control channel. However, the user needs to memorize all channel buttons corresponding to all home appliances, or puts marks on the channel buttons as a reminder. When the user forgets which channel button corresponds to which home appliance and when the channel buttons have no marks thereon, the user needs to test the channel buttons for finding the correct control channel to control the home appliance. Further, the host 50 is electronically connected with the infrared transmitters 501 through the wire. Even if the home appliance is placed in the cabinet, the wire still extends out of the cabinet for electronically connecting to the host 50. The host 50 may be taken in the cabinet, but some home appliances, such as a television, cannot be placed in the closed cabinet. Therefore, the wire extends out of the cabinet for electronically connecting the host 50 and the television. From the foregoing description, the remote control integrated system needs to be improved.

SUMMARY OF THE INVENTION

An objective of the present invention is to provide an integrated system of infrared remote controls.

To achieve the foregoing objective, the integrated system of the infrared remote control is adapted to home appliances controlled by infrared rays, and comprises a touch remote control and at least one infrared emitter.

The touch remote control comprises a touch display, a first connecting module, a storage unit, and a processing unit. The touch display provides at least one operation interface, and different operation interfaces are switched according to a page turning mode. The touch display further produces control commands. The storage unit stores a plurality of infrared codes, and each infrared code corresponds to one of the control commands. The processing unit is electronically connected to the touch display and the storage unit. The processing unit receives the control commands produced by the touch display, and produces a first control signal according to the control commands and the infrared code stored in the storage unit corresponding to the control commands. The first connecting module is electronically connected to the processing unit, receives the first control signal produced by the processing unit, produces a remote signal according to the first control signal, and transmits the remote signal.

Each infrared emitter comprises a second connecting module, a micro processing unit, an infrared module, a battery module, a solar panel, and a transforming module. The second connecting module is wirelessly connected to the first connecting module of the touch remote control for receiving the remote signal transmitted by the first connecting module. The micro processing unit is electronically connected to the second connecting module for receiving the remote signal, and produces a second control signal. The infrared module produces an infrared signal according to the second control signal. The infrared module is mounted on a first surface of the infrared emitter, electronically connected to the micro processing unit for receiving the infrared signal, and emits the infrared signal. The battery module is electronically connected to the second connecting module, the micro processing unit, and the infrared module to provide electric power. The solar panel is mounted on a second surface of the infrared emitter. The transforming module is connected to the solar panel and the battery module for transforming light power to the electric power, and charges the battery module.

The infrared emitter is mounted on an infrared receiver of each home appliance, and the infrared module of the infrared emitter is directly pointed to the infrared receiver of the home appliance.

The present invention does not need any wire to electronically connect the infrared emitter with a host. The infrared emitter is wirelessly connected to the touch remote control, and the touch remote control can directly remotely control the home appliance through the infrared emitter. Without the wire, the appearance of housing interior design can be maintained.

Other objectives, advantages and novel features of the invention will become more apparent from the following detailed description when taken in conjunction with the accompanying drawings.

DETAILED DESCRIPTION OF THE INVENTION

Figure 1:
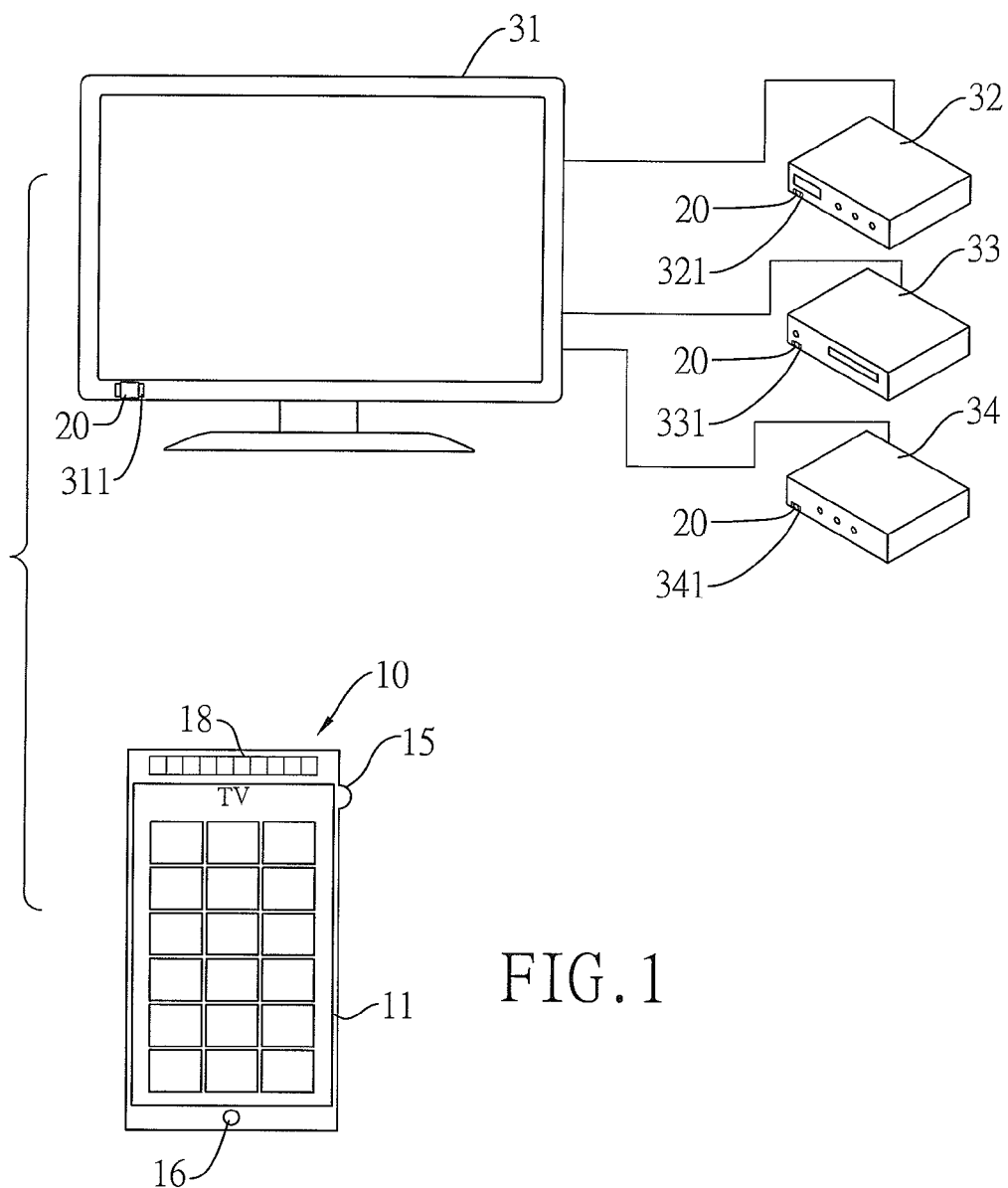
FIG. 1 is a schematic view of an integrated system of infrared remote controls of the present invention.
Figure 2:
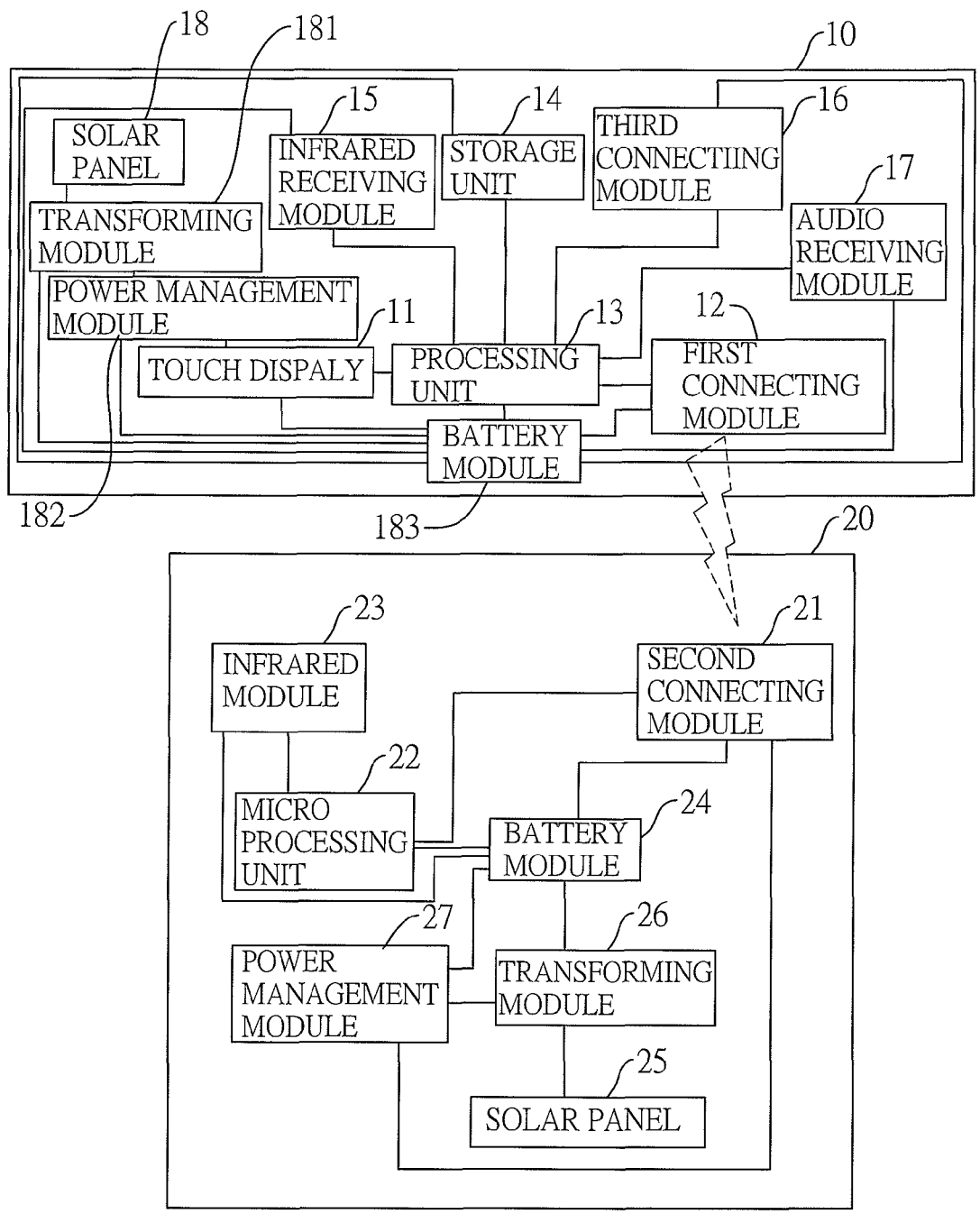
FIG. 2 is a block diagram of an integrated system of infrared remote controls of the present invention.

With reference to FIG. 1 and FIG. 2, the present invention is an integrated system of infrared remote controls. The integrated system integrates infrared remote controls of home appliances, and remotely controls the home appliance through a wireless connection. The integrated system comprises a touch remote control 10 and at least one infrared emitter 20. The touch remote control 10 comprises a touch display 11, a first connecting module 12, a processing unit 13, and a storage unit 14.

The touch display 11 provides at least one operation interface. When the touch display 11 has different operation interfaces, the operation interfaces are switched according to a page turning mode. The touch display 11 further produces control commands corresponding to operations by a user.

The processing unit 13 is electronically connected to the touch display 11 and the storage unit 14. The storage unit 14 stores a plurality of infrared codes, and each infrared code corresponds to one of the control commands. The processing unit 13 receives the control commands produced by the touch display 11, and produces a first control signal according to the control commands and the infrared codes stored in the storage unit corresponding to the control commands. The first connecting module 12 is electronically connected to the processing unit 13, receives the first control signal produced by the processing unit 13, produces a remote signal according to the first control signal, and transmits the remote signal. In an embodiment, the home appliances may be a television 31, a karaoke machine 32, a DVD player 33, or a set-top box 34. Each home appliance 31, 32, 33, 34 has an infrared receiver 311, 321, 331, 341. The operation interface is an intuitive human-machine operation interface. The infrared emitters 20 respectively adhere to the infrared receivers 311, 321, 331, 341.

Figure 3:
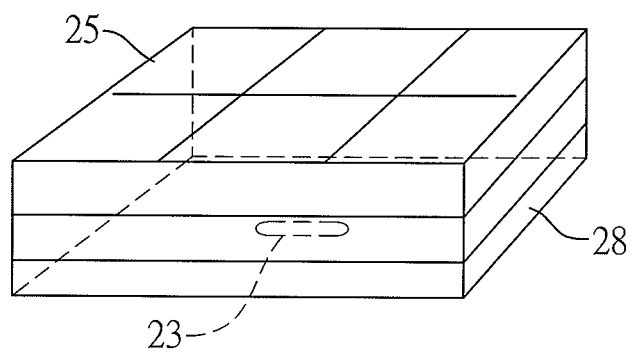
FIG. 3 is a perspective view of an infrared emitter of the present invention.

With reference to FIG. 2 and FIG. 3, each infrared emitter 20 comprises a second connecting module 21, a micro processing unit 22, an infrared module 23, a battery module 24, a solar panel 25, and a transforming module 26.

The second connecting module 21 is wirelessly connected to the first connecting module 12 of the touch remote control 10 for wirelessly receiving the remote signal transmitted from the first connecting module 12.

The micro processing unit 22 is electronically connected with the second connecting module 21 for receiving the remote signal, and produces a second control signal according to the remote signal.

The infrared module 23 is mounted on a first surface of the infrared emitter 20, and is electronically connected to the micro processing unit 22 for receiving the second control signal. The infrared module 23 further produces an infrared signal according to the second control signal for controlling a target device. In the embodiment, the target devices may be the home appliances 31, 32, 33, 34.

The battery module 24 is electronically connected with the second connecting module 21, the micro processing unit 22, and the infrared module 23 to provide electric power.

The solar panel 25 is mounted on a second surface of the infrared emitter 20. The second surface is opposite to the first surface. The transforming module 26 is electronically connected to the solar panel 25 and the battery module 24 for transforming light power to electric power, and charges the battery module 24. Therefore, the infrared emitter 20 does not need to charge, a battery. When the infrared emitter 20 runs out of electric power, the user puts the infrared emitter 20 at a place capable of being lit, and the infrared emitter 20 can be charged. In the embodiment, a wireless connection between the first connecting module 12 and the second connecting module 21 is the ZigBee.

Further with reference to FIG. 1, a plurality of the infrared emitters 20 is respectively attached to the infrared receivers 311, 321, 331, 341 of the home appliances 31, 32, 33, 34. The first surface of each infrared emitter is directly attached to the home appliance 31, 32, 33, 34. The infrared module 23 of the infrared emitter 20 thus aligns with the infrared receiver 311, 321, 331, 341 of the home appliance 31, 32, 33, 34. In the embodiment, the first surface comprises an adhesive layer 28 that does not cover the infrared module 23. Therefore, the infrared emitters 20 can adhere to the home appliances 31, 32, 33, 34.

In another embodiment, the infrared emitter 20 may comprise at least one magnet (not shown in the drawings), and the magnet is mounted on the first surface. Then, the infrared emitter 20 can be attracted on the home appliance 31, 32, 33, 34 by the magnet.

The infrared emitter 20 emits the infrared signal through the infrared module 23 to one of the home appliances 31, 32, 33, 34, and said one of the home appliances 31, 32, 33, 34 can be remotely controlled by the touch remote control 10. The touch remote control 10 is wirelessly connected with the infrared emitter 20, and the wireless connection between the touch remote control 10 and the infrared emitter 20 is not an infrared ray. Therefore, when the home appliances 31, 32, 33, 34 are placed in a cabinet with a door of the cabinet closed, the touch remote control 10 can be wirelessly connected with the infrared emitter 20 to transmit the remote signal for remotely controlling each home appliance 31, 32, 33, 34.

The touch remote control 10 remotely controls the infrared emitter 20 through the wireless connection, and the infrared emitter 20 emits the infrared signal to the infrared receiver 311, 321, 331, 341 of the home appliance 31, 32, 33, 34. The current home appliances 31, 32, 33, 34 can be controlled by the present invention by integrating infrared remote control functions of the home appliances 31, 32, 33, 34 into the touch remote control 10. In practical use, the user only needs to mount the infrared emitters 20 on the infrared receivers 311, 321, 331, 341 of the home appliance 31, 32, 33, 34. Then, the touch remote control 10 can remotely control the home appliances 31, 32, 33, 34. The present invention has no wire that would affect the appearance of the housing interior design, and can be set up easily.

The infrared emitter 20 may further comprise a power management module 27. The power management module 27 is electronically connected with the battery module 24, the transforming module 26, and the second connecting module 21 to manage the electric power of the battery module 24. For example, when the touch remote control 10 has remained unused for a preset time period, in other words, the second connecting module 21 does not receive the remote signal for the preset time period, the power management module 27 of the infrared emitter 20 can manage the electric power of the battery module 24, and the infrared emitter 20 enters a sleep mode for reducing electric power consumption.

An example of the sleep mode is that the battery module 24 only provides the electric power to the second connecting module 21 and the power management module 27 for awaiting receipt of the remote signal, and does not provide electric power to the micro processing unit 22 and the infrared module 23, to reduce the electric power consumption. Once the second connecting module 21 receives the remote signal, the power management module 27 controls the battery module 24 to provide electric power to the micro processing unit 22 and the infrared module 23.

Figure 4:
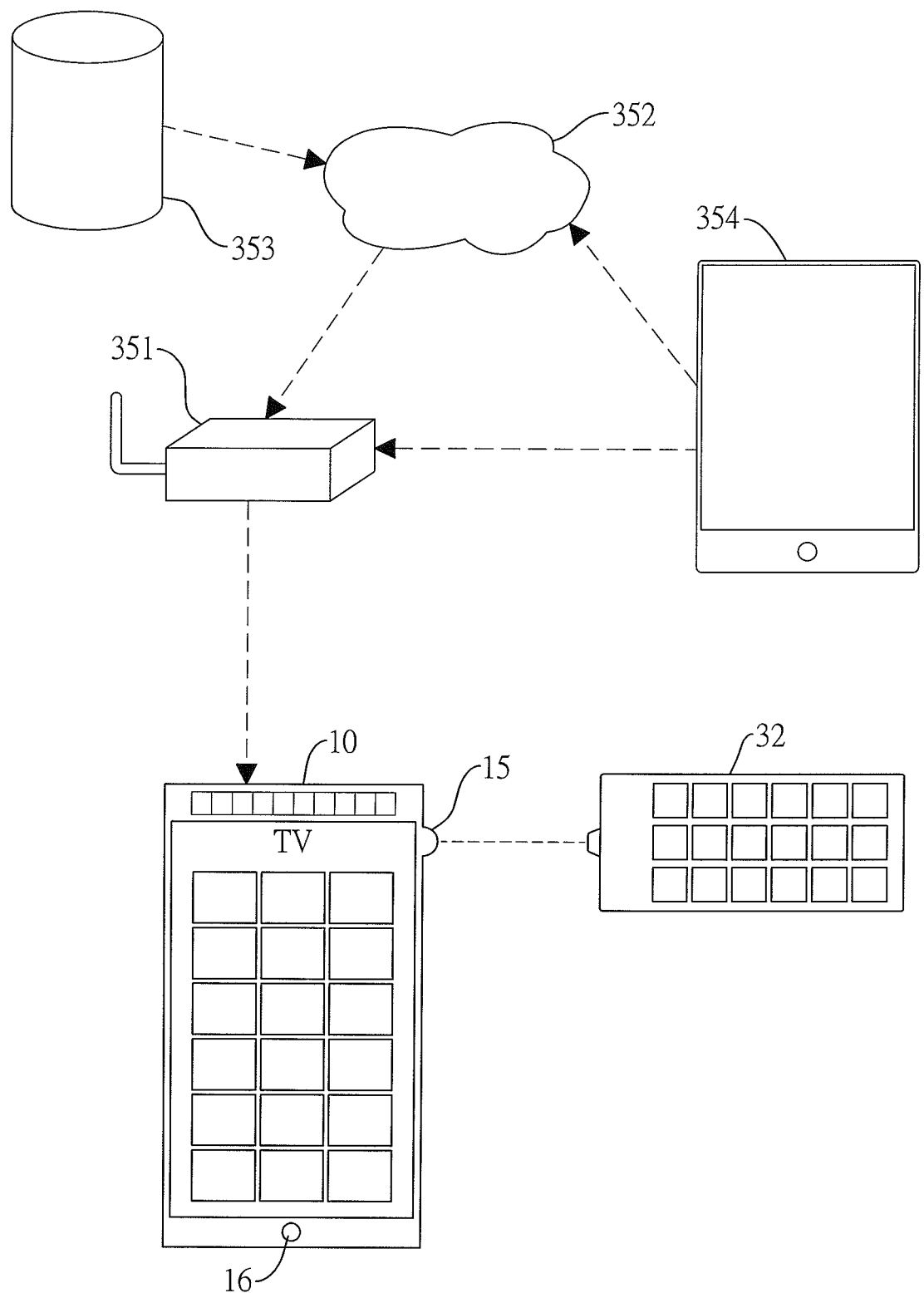
FIG. 4 is a schematic view of setting up and using a touch remote control of the present invention.

With reference to FIG. 4, the touch remote control 10 further comprises an infrared receiving module 15 and a third connecting module 16. The infrared receiving module 15 is electronically connected to the processing unit 13. The infrared receiving module 15 receives an infrared signal output by the infrared remote control of the home appliance 31, 32, 33, 34, and the processing unit 13 stores an infrared code of the infrared signal output by the infrared remote control and a function corresponding to the infrared code into the storage unit 14.

The user can further use a smart mobile device, such as a smart phone 354. The smart phone 354 can connect to the Internet 352 via an Internet device 351, and control the touch remote control 10 through the Internet 352, and the third connecting module 16. In other words, the smart phone 354 can remotely control the home appliances 31, 32, 33, 34 through the touch remote control 10. For example, when the user is not at home but wants to use the television 31 and a recorder (not shown in figure) to record a TV show, the user can use the smart phone 354 from anywhere to remotely control the recorder and the television 31 through the Internet 352 for recording the TV show. In the embodiment, the third connecting module 16 is wirelessly connected to the Internet device 351 by Wi-Fi.

The infrared code and the function of the infrared code follow an infrared protocol. Each of the home appliances has a respective infrared protocol. In the embodiment, the respective infrared protocol of the home appliance is stored in the storage unit 14. Therefore, to set up the touch remote control 10, a setting button of the infrared remote control of the home appliance 31, 32, 33, 34 is pressed, and the infrared emitter 20 of an infrared remote control of the television 31 points to the infrared receiving module 15 of the touch remote control 10. The touch remote control 10 receives the infrared signal, and determines which infrared protocol corresponds to the television 31 according to the infrared signal. Then, the touch remote control 10 can remotely control the television 31.

The third connecting module 16 is electronically connected to the processing unit 13, and is wirelessly connected to the Internet device 351 for connecting to the Internet 352. Therefore, the touch remote control 10 can connect to the Internet 352 through the third connecting module 16 and the Internet device 351, and further connect to an exclusive database 353 of an exclusive website. Then, the touch remote control 10 can download the infrared codes of the infrared signal and the function corresponding to the infrared code from the exclusive database 353 according to the infrared protocol of the home appliance 31, 32, 33, 34.

Figure 5:
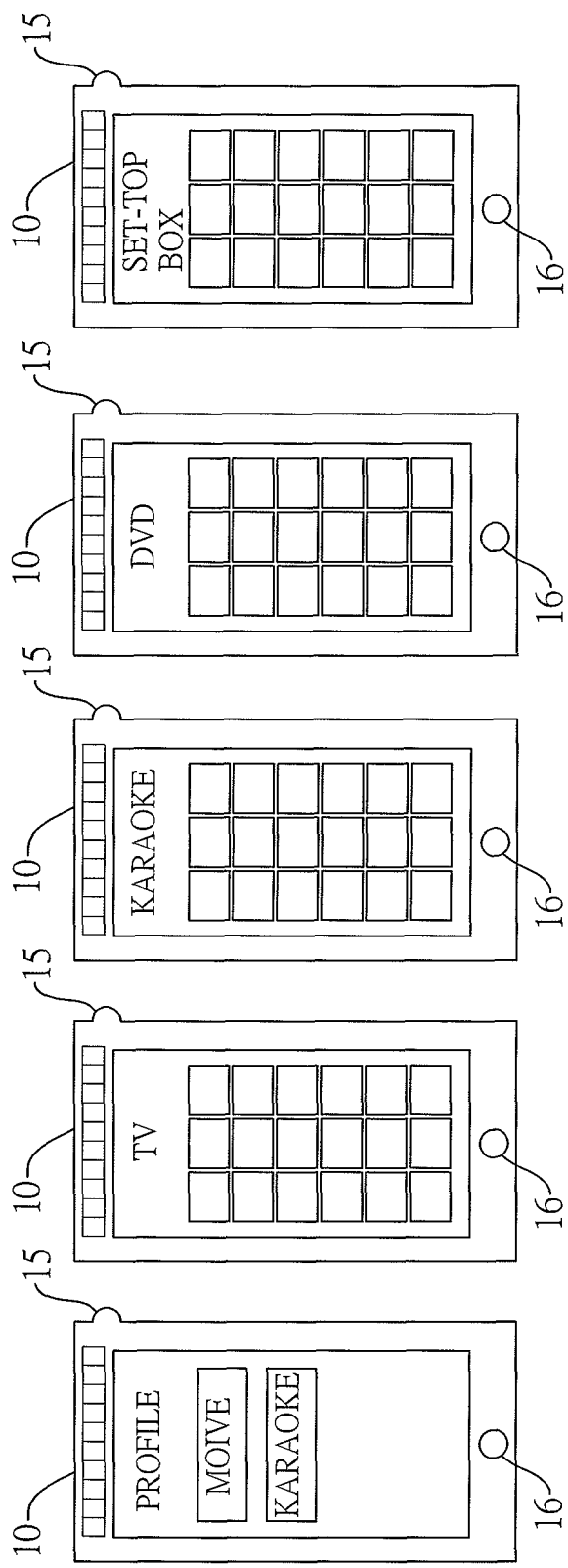
FIG. 5A to FIG. 5E are schematic views of different operation interfaces of a touch remote control of the present invention.
Figure 6:
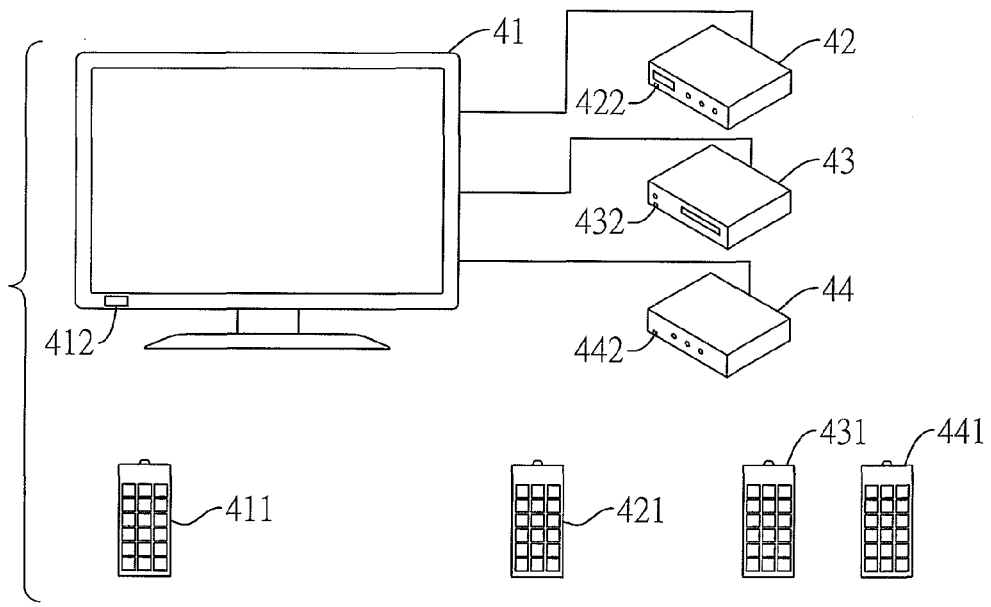
FIG. 6 is a schematic view of home appliances and remote controls corresponding to the home appliances of the prior art.
Figure 7:
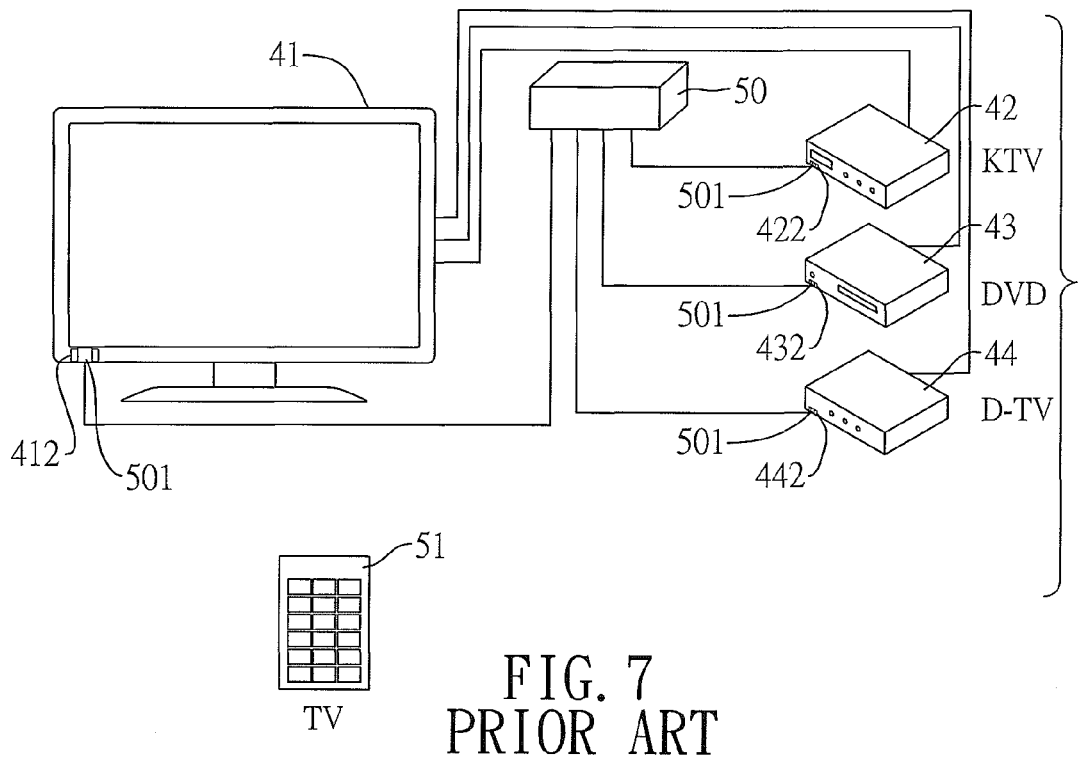
FIG. 7 is a schematic view of an integrated system of the prior art.

With reference to FIGS. 5B to 5E, when the protocol corresponding to the television 31 is determined, the touch remote control 10 produces an operation interface corresponding to the television 31 as shown in FIG. 5B. Each home appliance 31, 32, 33, 34 has a respective operation interface as shown in FIG. 5C to FIG. 5E. The operation interfaces can be named by the user for ease of memorizing, and the operation interfaces are sequentially switched by an act of page turning, such as sliding on the touch display 11 to switch the operation interfaces. Then, the user can use the touch remote control 10 to remotely control the different home appliances 31, 32, 33, 34 by their respective operation interfaces.

The touch remote control 10 further comprises an audio receiving module 17. The audio receiving module 17 receives an audio signal and is electronically connected with the processing unit 13 for transmitting the audio signal to the processing unit 13. The storage unit 14 further stores a speech recognition database. The speech recognition database records a plurality of audio signals and voice control commands, and each audio signal corresponds to one voice control command. The processing unit 13 receives the audio signal output by the audio receiving module 17 and determines the voice control commands corresponding to the audio signals by referring to the speech recognition database. The processing unit 13 produces the first control signal according to the voice control commands corresponding to the audio signals, and, then, the user can use the touch remote control 10 to sound control the home appliances 31, 32, 33, 34.

With reference to FIG. 1 and FIG. 2, the touch remote control 10 further comprises a solar panel 18, a transforming module 181, a power management module 182, and a battery module 183.

The battery module 183 is electronically connected with the touch display 11, the first connecting module 12, the processing unit 13, the storage unit 14, the infrared receiving module 15, the third connecting module 16, and the audio receiving module 17 to provide electric power.

The solar panel 18 is mounted on a surface of the touch remote control 10.

The transforming module 181 is electronically connected to the solar panel 18 and the battery module 183 for transforming light power to electric power, and charges the battery module 183. Therefore, the touch remote control 10 does not need to change charge a battery. When the touch remote control 10 runs out of the electric power, the user puts the touch remote control 10 at a place capable of being lit to charge the touch remote control 10.

The power management module 182 is electronically connected with the touch display 11, the transforming module 181, and the battery module 183 to manage the electric power stored in the battery module 183. For example, when the touch remote control 10 has been unused for a preset time, in other words, the touch display 11 produces no control commands during the preset time period, the power management module 182 can manage the electric power of the battery module 183, and the touch remote control 10 enters a sleep mode for reducing electric power consumption.

An example of the sleep mode is that the battery module 183 only provides electric power to the touch display 11 and the power management module 182 for awaiting the control commands, and does not provide electric power to the first connecting module 12, the processing unit 13, the storage unit 14, the infrared receiving module 15, the third connecting module 16, and the audio receiving module 17, to reduce the electric power consumption. Once the touch display 11 produces the control commands, the power management module 182 controls the battery module 183 to provide electric power to the first connecting module 12, the processing unit 13, the storage unit 14, the infrared receiving module 15, the third connecting module 16 and the audio receiving module 17.

Each infrared emitter 20 has a serial number, and the first control signal includes the serial number of the infrared emitter 20. The touch remote control 10 can wirelessly connect to a particular infrared emitter 20 according to the serial number of the infrared emitter 20 included in the first control signal for transmitting the remote signal. In the embodiment, a wireless connection between the touch remote control 10 and the infrared emitter 20 is ZigBee. According to features of the ZigBee, the touch remote control 10 can wirelessly connect to any infrared emitter 20 firstly, and consequently wirelessly connect to any other infrared emitter 20 through the infrared emitter 20 that has been connected according to the serial number specified in the first control signal.

With reference to FIG. 4, the touch remote control 10 further comprises a profile function. The user can select a profile, and the processing unit 13 of the touch remote control 10 produces a plurality of first control signals and a plurality of remote signals to automatically remotely control a plurality of home appliances through the infrared emitters 20. The first control signals and the remote signals produced by the processing unit 13 according to the selected profile are preset by the user. The user can select particular infrared emitters 20, and select the remote signals transmitted to each selected infrared emitter 20 in advance of setting the profile.

For example, when the user selects a movie profile, the touch remote control 10 remotely controls the DVD player 33 to turn on its power and play a movie. The touch remote control 10 further remotely controls the television 31 to turn on its power and select its video input connected to the DVD player 33, such as HDMI, for playing the movie video. When the user selects a karaoke profile, the touch remote control 10 remotely controls the karaoke machine 32 to open its power. The touch remote control 10 remotely controls the television 31 to turn on its power and select its video input connected to the karaoke machine 32, so that the user can enjoy singing.

The present invention can integrate the infrared remote controls of the home appliances 31, 32, 33, 34 into the touch remote control 10. The touch remote control 10 is wirelessly connected with the infrared emitters 20, and the infrared emitters 20 respectively adhere to the home appliances 31, 32, 33, 34 by the adhesive layer 28 or attracted on the home appliances 31, 32, 33, 34 by the magnets. The infrared emitters 20 are easily mounted on the home appliances 31, 32, 33, 34, and the touch remote control 10 can control the home appliances 31, 32, 33, 34 through the infrared emitters 20. It is very convenient for the user to use the home appliances 31, 32, 33, 34 with the one touch remote control 10.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An integrated system of infrared remote controls, comprising:
   a plurality of target devices each including an infrared receiver;
   a touch remote control comprising:
      a touch display providing at least one operation interface and producing control commands, wherein the at least one operation interface is switched by page turning;
      a storage unit storing a plurality of infrared codes each respectively corresponding to one of the control commands;
      a processing unit electronically connected to the touch display and the storage unit; wherein the processing unit receives the control commands produced by the touch display, produces a first control signal according to the control commands and the plurality of infrared codes stored in the storage unit corresponding to the control commands; and
      a first connecting module connected to the processing unit, receiving the first control signal produced by the processing unit, and producing and transmitting a remote signal according to the first control signal; and
   a plurality of infrared emitters respectively attached to the plurality of target devices, wherein each infrared emitter comprises:
      a second connecting module wirelessly connected to the first connecting module of the touch remote control for wirelessly receiving the remote signal transmitted from the first connecting module;
      a micro processing unit electronically connected with the second connecting module for receiving the remote signal, and producing a second control signal according to the remote signal;
      an infrared module mounted on a first surface of the infrared emitter, electronically connected to the micro processing unit for receiving the second control signal, and producing an infrared signal according to the second control signal for controlling the at least one target device; and
      a battery module electronically connected with the second connecting module, the micro processing unit, and the infrared module to provide electric power, wherein the touch remote control further comprises a third connecting module electronically connected to the processing unit and wirelessly connected to the Internet; wherein the processing unit connects to the Internet through the third connecting module, connects to an exclusive database of an exclusive website including infrared codes used by the touch remote control to control the plurality of target devices, downloads infrared codes from the exclusive database, and stores the infrared codes in the storage unit, wherein the touch remote control is wirelessly connected to a corresponding infrared emitter to transmit the remote signal to a corresponding infrared emitter, and wherein the corresponding infrared emitter emits the infrared signal according to the remote signal received to a corresponding target device to control the corresponding target device.

2. The integrated system of infrared remote controls as claimed in claim 1, wherein the first surface further comprises at least one magnet.

3. The integrated system of infrared remote controls as claimed in claim 1, wherein the at least one infrared emitter further comprises a power management module electronically connected with the battery module and the second connecting module; and wherein when the second connecting module does not receive the remote signal for a preset time period, the at least one infrared emitter enters a sleep mode.

4. The integrated system of infrared remote controls as claimed in claim 1, wherein the touch remote control further comprises an infrared receiving module electronically connected to the processing unit for receiving an infrared signal output by an infrared remote control; and wherein the processing unit stores an infrared code of the infrared signal output by the infrared remote control and a function corresponding to the infrared code output by the infrared remote control into the storage unit.

5. The integrated system of infrared remote controls as claimed in claim 1, wherein:
    each infrared emitter has a serial number, and the first control signal includes the serial number of the infrared emitter;
    the touch remote control wirelessly connects to a particular one of the at least one infrared emitter according to the serial number of said infrared emitter included in the first control signal for transmitting the remote signal; and
    the processing unit of the touch remote control allows a user to select a plurality of infrared emitters and control commands to produce a plurality of first control signals and a plurality of remote signals.

6. The integrated system of infrared remote controls as claimed in claim 1, further comprising a smart mobile device; wherein the smart mobile device connects to the Internet, and controls the touch remote control through the Internet and the third connecting module to produce the first control signal.

7. The integrated system of infrared remote controls as claimed in claim 1, wherein:
    the touch remote control further comprises an audio receiving module;
    the audio receiving module receives an audio signal and is electronically connected with the processing unit to the touch remote control for transmitting the audio signal to the processing unit;
    the storage unit of the touch remote control further stores a speech recognition database;
    the speech recognition database records a plurality of audio signals and control commands, and each audio signal corresponds to one of the control commands; and
    when the processing unit receives the audio signal, the processing unit determines the control commands corresponding to the audio signals by referring to the speech recognition database, produces the first control signal according to the control commands corresponding to the audio signals, and transmits the first control signal to the first connecting module.

8. The integrated system of infrared remote controls as claimed in claim 1, wherein the touch remote control further comprises:
    a battery module electronically connected with the touch display, the first connecting module, the processing unit, and the storage unit to provide electric power;
    a solar panel mounted on a surface of the touch remote control; and
    a transforming module electronically connected to the solar panel of the touch remote control and the battery module of the touch remote control for transforming light power to the electric power, and charging the battery module of the touch remote control.

9. The integrated system of infrared remote controls as claimed in claim 8, wherein the touch remote control further comprises a power management module electronically connected with the battery module of the touch remote control, the transforming module of the touch remote control, and the touch display of the touch remote control; and wherein when the touch display does not produce the control commands for a preset time period, the at least one infrared emitter enters a sleep mode.

10. The integrated system of infrared remote controls as claimed in claim 1, wherein each infrared emitter further comprises:
    a solar panel mounted on a second surface of the infrared emitter opposite to the first surface; and
    a transforming module electronically connected to the solar panel and the battery module for transforming light power to the electric power to charge the battery module.

* * * * *